(12) United States Patent
Clark

(10) Patent No.: US 10,655,391 B1
(45) Date of Patent: May 19, 2020

(54) SAFETY DEVICE FOR AN EXTENSION LADDER

(71) Applicant: Ezra Clark, Jacksonville, FL (US)

(72) Inventor: Ezra Clark, Jacksonville, FL (US)

( * ) Notice: Subject to any disclaimer, the term of this patent is extended or adjusted under 35 U.S.C. 154(b) by 0 days.

(21) Appl. No.: 15/612,790

(22) Filed: Jun. 2, 2017

(51) Int. Cl.
*E06C 7/48* (2006.01)
*E06C 1/12* (2006.01)
*F16C 11/10* (2006.01)

(52) U.S. Cl.
CPC ............... *E06C 7/488* (2013.01); *E06C 1/12* (2013.01); *F16C 11/10* (2013.01); *Y10T 403/32434* (2015.01)

(58) Field of Classification Search
CPC ............... E06C 7/50; Y10T 403/32434; Y10T 16/540255; Y10T 403/32368; Y10T 16/540254; Y10T 16/538; E05D 11/1028; E05D 11/1078; E05D 2011/1035; F16C 11/00; F16C 11/10
USPC .......................................................... 160/344
See application file for complete search history.

(56) References Cited

U.S. PATENT DOCUMENTS

| | | | | |
|---|---|---|---|---|
| 566,521 A | * | 8/1896 | Leger | F16B 7/105 403/105 |
| 4,152,810 A | * | 5/1979 | Martinez | E06C 1/32 16/325 |
| 4,540,306 A | * | 9/1985 | Wang | E06C 1/32 16/332 |
| 4,543,006 A | * | 9/1985 | Wang | E06C 1/32 16/332 |
| 4,697,305 A | * | 10/1987 | Boothe | E06C 1/32 16/329 |
| 4,736,417 A | * | 4/1988 | Van Dyke | H04M 1/05 379/449 |
| 4,773,503 A | * | 9/1988 | Purkapile | E06C 1/32 16/323 |
| 4,934,485 A | * | 6/1990 | Purkapile | E06C 1/005 182/104 |
| 4,947,959 A | * | 8/1990 | Yuen | E06C 1/32 182/163 |
| 5,163,532 A | * | 11/1992 | McCarty | E06C 1/32 182/108 |
| 5,165,501 A | | 11/1992 | Donahey | |
| 5,228,535 A | * | 7/1993 | McCarty | E06C 1/32 182/163 |
| 5,279,387 A | * | 1/1994 | Swiderski | E06C 1/32 182/108 |
| 5,282,520 A | * | 2/1994 | Walker | A01M 31/006 182/116 |
| 5,487,207 A | * | 1/1996 | Rey | E06C 1/32 16/330 |
| 5,689,999 A | * | 11/1997 | Wiley | A61G 5/12 403/107 |

(Continued)

*Primary Examiner* — Daniel P Cahn
(74) *Attorney, Agent, or Firm* — Lawrence J. Gibney

(57) ABSTRACT

When a person uses an extension ladder it is imperative that the extension ladder is placed securely against the structure so that it will not sway from side to side or tip to prevent personal injury to the person who is standing on the ladder. The device will permit the use of an extension ladder as originally intended, but will also provide additional surface area that is placed on the roof surface to insure greater stability to the ladder. The device will be attached to an extension ladder and will self-adjust as the extension ladder is placed on the roof of the structure.

5 Claims, 4 Drawing Sheets

(56) References Cited

U.S. PATENT DOCUMENTS

| | | | |
|---|---|---|---|
| 5,954,157 A * | 9/1999 | Grimes | E06C 1/12 16/329 |
| 6,012,546 A * | 1/2000 | Bee | E06C 7/44 182/106 |
| 6,152,261 A | 11/2000 | Hoey | |
| 6,322,279 B1 * | 11/2001 | Yamamoto | B60R 9/045 224/324 |
| 6,343,406 B1 * | 2/2002 | Yeh | E05D 11/1007 16/328 |
| 6,565,156 B1 * | 5/2003 | Yamashita | A47C 1/026 297/354.12 |
| 6,942,063 B1 | 9/2005 | Huett, Jr. | |
| 8,424,639 B1 * | 4/2013 | Davis | E06C 1/397 182/115 |
| 8,640,826 B1 * | 2/2014 | Beilstein | E06C 5/02 114/362 |
| 10,557,227 B2 * | 2/2020 | Felsenthal | D06F 57/08 |
| 2004/0045770 A1 * | 3/2004 | Duan | E06C 1/12 182/213 |
| 2004/0129497 A1 * | 7/2004 | Weiss | E06C 1/32 182/163 |
| 2005/0028320 A1 * | 2/2005 | Latimer | E04F 11/064 16/231 |
| 2005/0087732 A1 * | 4/2005 | Short | E01F 13/022 256/26 |
| 2005/0092549 A1 * | 5/2005 | Winslow | E06C 1/18 182/163 |
| 2005/0121260 A1 * | 6/2005 | Leng | E06C 1/32 182/156 |
| 2005/0139425 A1 * | 6/2005 | Thomas | E06C 1/34 182/214 |
| 2005/0166364 A1 * | 8/2005 | Lee | E05D 11/0054 16/324 |
| 2005/0268434 A1 * | 12/2005 | Burbrink | E06C 1/32 16/324 |
| 2005/0274571 A1 * | 12/2005 | Simpson | E06C 1/18 182/23 |
| 2007/0158138 A1 * | 7/2007 | Sheffield | E06C 7/423 182/172 |
| 2007/0227819 A1 * | 10/2007 | Layfield | E06C 1/34 182/206 |
| 2010/0207407 A1 * | 8/2010 | Walker, Jr. | B01D 46/4227 294/210 |
| 2010/0230208 A1 | 9/2010 | Hsiao | |
| 2012/0067164 A1 * | 3/2012 | Su | B25G 1/06 74/575 |

* cited by examiner

SAFETY DEVICE FOR AN EXTENSION LADDER

REFERENCE TO RELATED APPLICATIONS

The present application claims the priority date of U.S. patent application Ser. No. 15/612,790 filed on Jun. 2, 2017.

FIELD OF THE INVENTION

This device relates to a ladder and more specifically insuring the safety of an extension ladder. Extension ladders are frequently used to allow access to a roof. Unfortunately, if the ladder slides to one side, the ladder may lose contact with the roof line and the person may be thrown from the ladder. This may result in great bodily injury.

This device is a self-adjusting assembly that will attach to the side of the ladder and will help ensure that the ladder is firmly in place on the roof to prevent the ladder from moving side to side or moving backwards. This may also be integrated into one end of the ladder as well.

PRIOR ART

There are many other prior art references to ladders and ladder safety in general. A representative sample of this can be found in Bee (U.S. Pat. No. 6,012,546). This is a safety ladder with an attachment at the end of the ladder, which provides a surface that is placed on the roof. Bee is different from the current application in that Bee can produce the effect of having a ladder not touch the roofline which makes the ladder inherently unstable.

Another prior art reference can be found in Donahey (U.S. Pat. No. 5,165,501), which is a ladder support attachment. Again this is used to place additional surface on the roof but again like the Bee reference, forces the ladder away from the roofline. It is also not self-adjusting and the same can be said for Bee.

Another reference can be found at Hsiao (U.S. Patent Publication 2010/0230208). This is a convertible multi-purpose ladder stabilizer which is attached to one end of the ladder and then is used to provide additional surface area on the roof. It is not self-adjusting like the current application. There are other references in the prior art, but none of the prior art references teach the specific function and features of the current application.

BRIEF SUMMARY OF THE INVENTION

This device will ensure that a ladder is safely placed on a roof to prevent the ladder from moving from side to side or backwards and preventing injury to someone on the ladder. It provides additional stability by placing a footer or pad on the roof surface to provide stability.

The difficulties in placing a ladder with an attachment on the roof is that a person must guess as to the best possible position while the ladder is on the ground.

This is a device that will be self-adjusting and use a ratchet mechanism, which is attached to an extension ladder that is placed on the roof. The ratchet mechanism will allow the device to self-adjust so that the footer that is part of this device lays flat on the roof while the ladder makes contact with the roof line or gutter that is common on roofs. Because it is self-adjusting the individual does not need to perform any additional adjustments to the ladder or the ladder assembly while the device is on the ground. It is important that the appropriate surface of the footers of the device lie flat on the roof to give the ladder added and needed stability.

Additionally, the shape of the footer may vary depending on the particular roof that may be involved.

NUMBER REFERENCES

1—Extension Ladder
5—Device
6—Handle
7—Footer
8—Element to secure the footer
9—Connection Piece not identified in drawings
10—First member
15—Second member
20—Holes to secure the connection piece to the second member
22—Holes to secure the device to the extension ladder
25—Element connecting the first member to the second member
30—Spring
40—Angular teeth

DETAILED DESCRIPTION OF THE EMBODIMENTS

An extension ladder 1 is used frequently to allow an individual to get on a roof of another tall structure. The extension ladder can be adjusted to various heights. Often the extension ladder stands on the ground and leans against the roof line of a building, typically a house or office building. A primary danger of using this type of ladder is that the ladder is prone to move from side to side when the ground is unstable or the person who is on the ladder shifts. When this occurs, there is a high likelihood that the person on the ladder may fall or be thrown to the ground resulting in serious personal injury.

Figure 5:
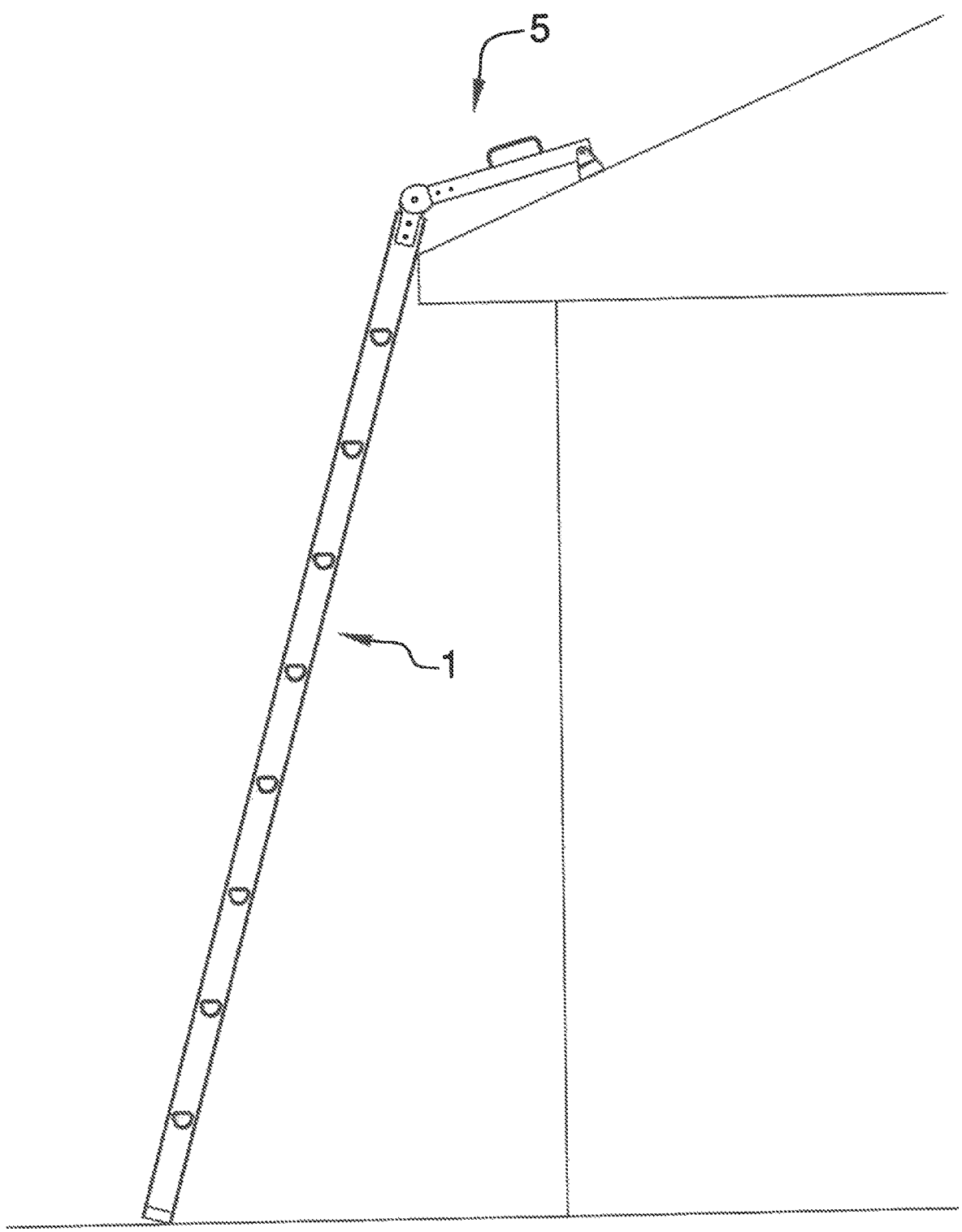
FIG. 5 is an in-use view of the device as depicted on a roof.

This safety device 5 is attached to the top of the extension ladder 1 and, when in use, is positioned such as shown in FIG. 5. The safety device 5 will have a handle 6 that is secured to a rigid connection piece 9; the connection piece can be detached from the second number 15. The safety device 5 can be moved from one extension ladder to a different extension ladder, as needed by the user.

The device will be attached at one end of the extension ladder using a bolt or screw 22 and using existing through-holes provided in the extension ladder. If through holes are not part of the extension ladder the extension ladder can be modified to accommodate the device. It has been anticipated that an extension ladder and safety device 5 could be integrated together rather than the safety device 5 being retrofitted or attachable.

Figure 1:
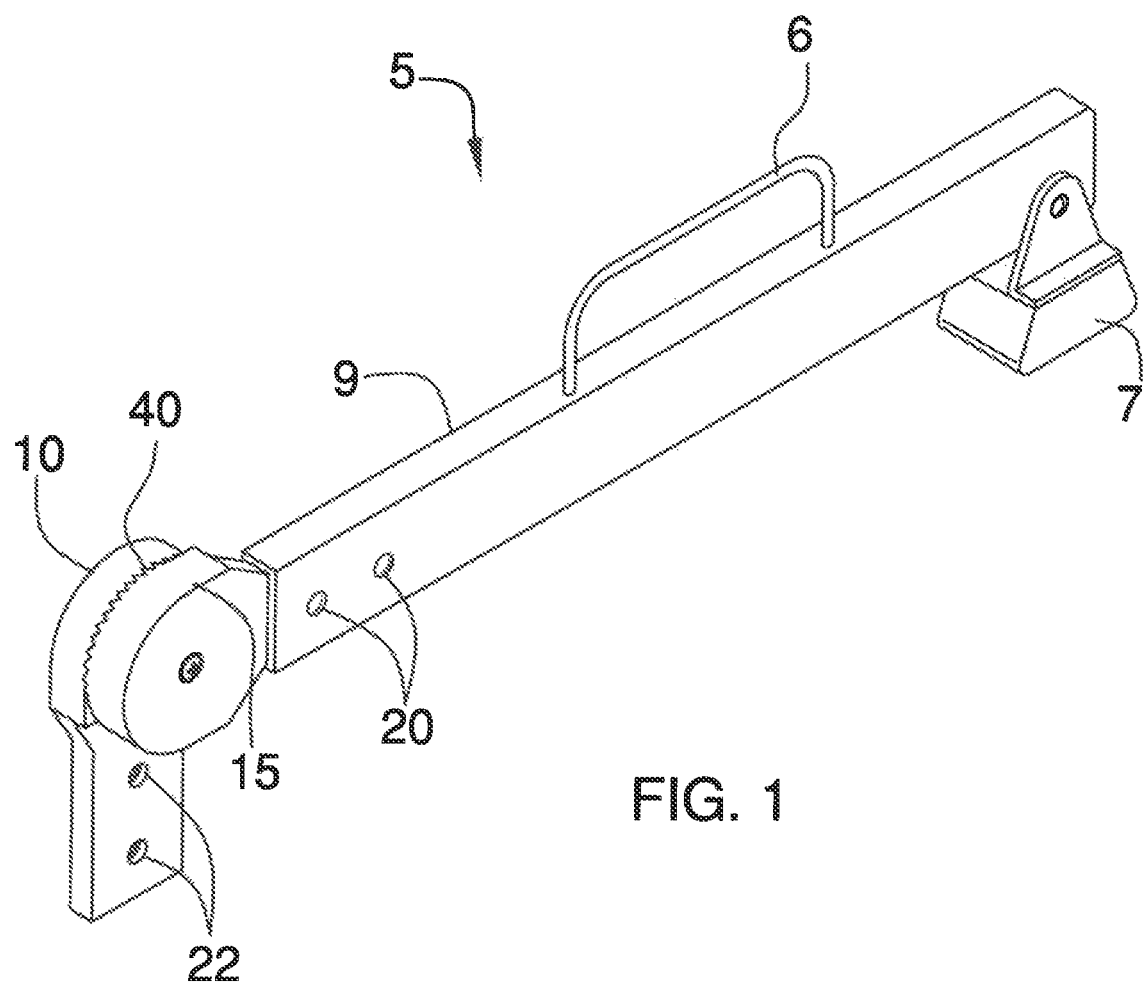
FIG. 1 is an isometric view of the device.
Figure 2:
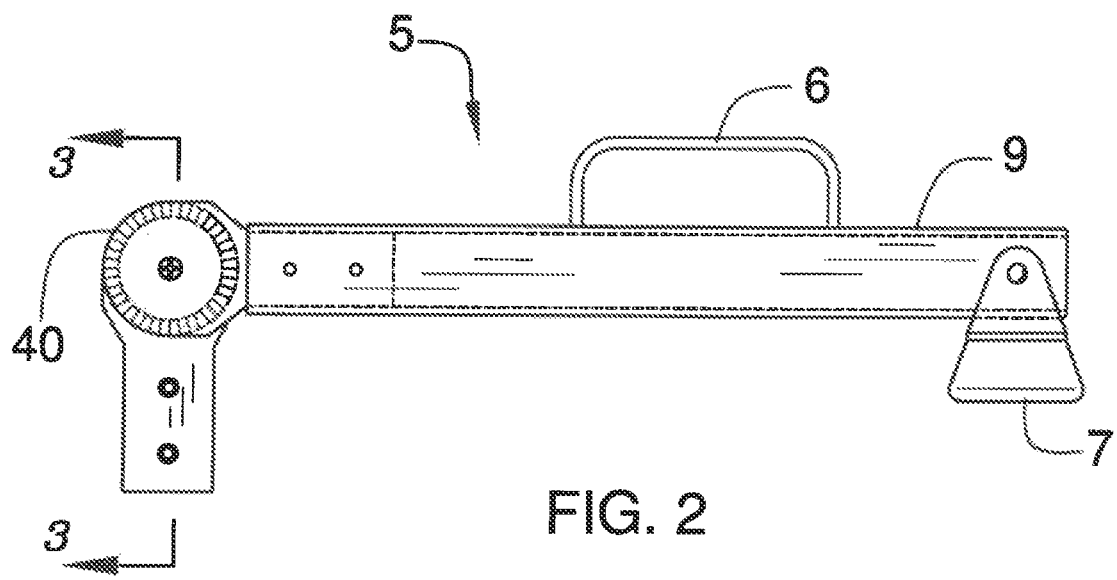
FIG. 2 is a side view of the device.
Figure 3:
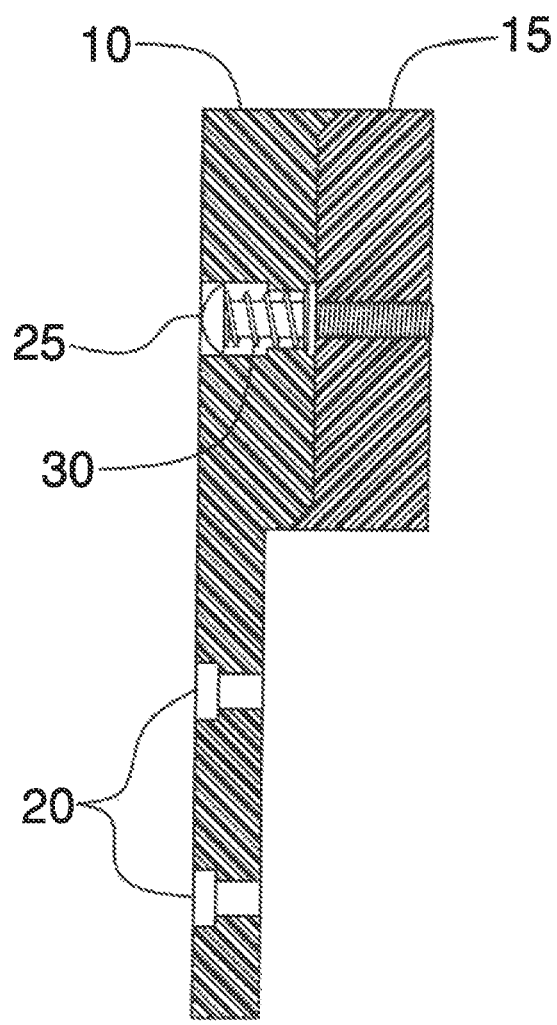
FIG. 3 is a view according to line 3-3 on FIG. 2.

A laterally separating ratchet mechanism that has a first member 10 and a second member 15 is proximate to the extension ladder. The first member 10 has a first end and a second end. The first end of the first member 10 attaches to the side rail of an extension ladder or is inserted into the side rail of the extension ladder and the second end has a first plurality of angled teeth, which can be seen in FIG. 1 and FIG. 3. There is also a first through-hole at the second end of the first member 10. The second member 15 also has a first end and a second end. The first end of the second member 15 attaches to the connection piece 9 using a set of through holes 20 for that purpose. The second end of the second member 15 has a second plurality of angled teeth 40, which is shown in FIG. 1 and FIG. 3. A second through-hole is also provided in the second member 15 to attach the second member 15 to the first member 10.

The first member 10 and the second member 15 are attached together with a connecting element 25 at each member's second end. The connecting element is comprised of a spring load nut, bolt, and washer. Between the head of the bolt and nut is the spring 30, which is placed in a cavity of the second member 15 as shown in FIG. 3. While the spring 30 is shown as being placed in a cavity of the second member 15, it may extend further into first member 10. The spring-loaded bolt and nut compress the first member 10 and the second member 15 together. The bolt 25 is threaded into the first member as depicted in FIG. 3.

When the first member 10 and second member 15 are attached together with the spring-loaded bolt and nut, the teeth of each member mate together, thereby allowing the mechanism to freely rotating rotate in only one direction. When the laterally separating ratcheting mechanism rotates freely in the one direction, the first plurality of teeth of the first member slide along the second plurality of teeth of the second member. Accordingly, as the first plurality of teeth and second plurality of teeth slide against each other, the first member and second member laterally separate, which compresses the spring 30. The spring 30 and angle of the teeth help to insure that the plurality teeth of each member interlock and prevent the ratcheting mechanism from rotating in an undesired the opposite direction. In other words, the spring 30 helps insure that the teeth of the ratcheting mechanism can lock the safety device against a roof while it is in use.

The user may manually rotate the device against the teeth by manually pulling the first member 10 apart from the second member 15 and rotating the two members until reaching the desired location. Once the user has found the desired location, she or he can release the members and the two members will spring back together and lock.

The handle 6 is provided to allow the user to rotate the connection piece 9 and footer 7 onto the roof once the user has ascended a predetermined distance. As the user grabs the handle 6 he or she will rotate the device in a clockwise fashion to contact the roof surface. Because of the angled teeth and bolt and string this connection is prevented from rotating backwards.

Figure 4:
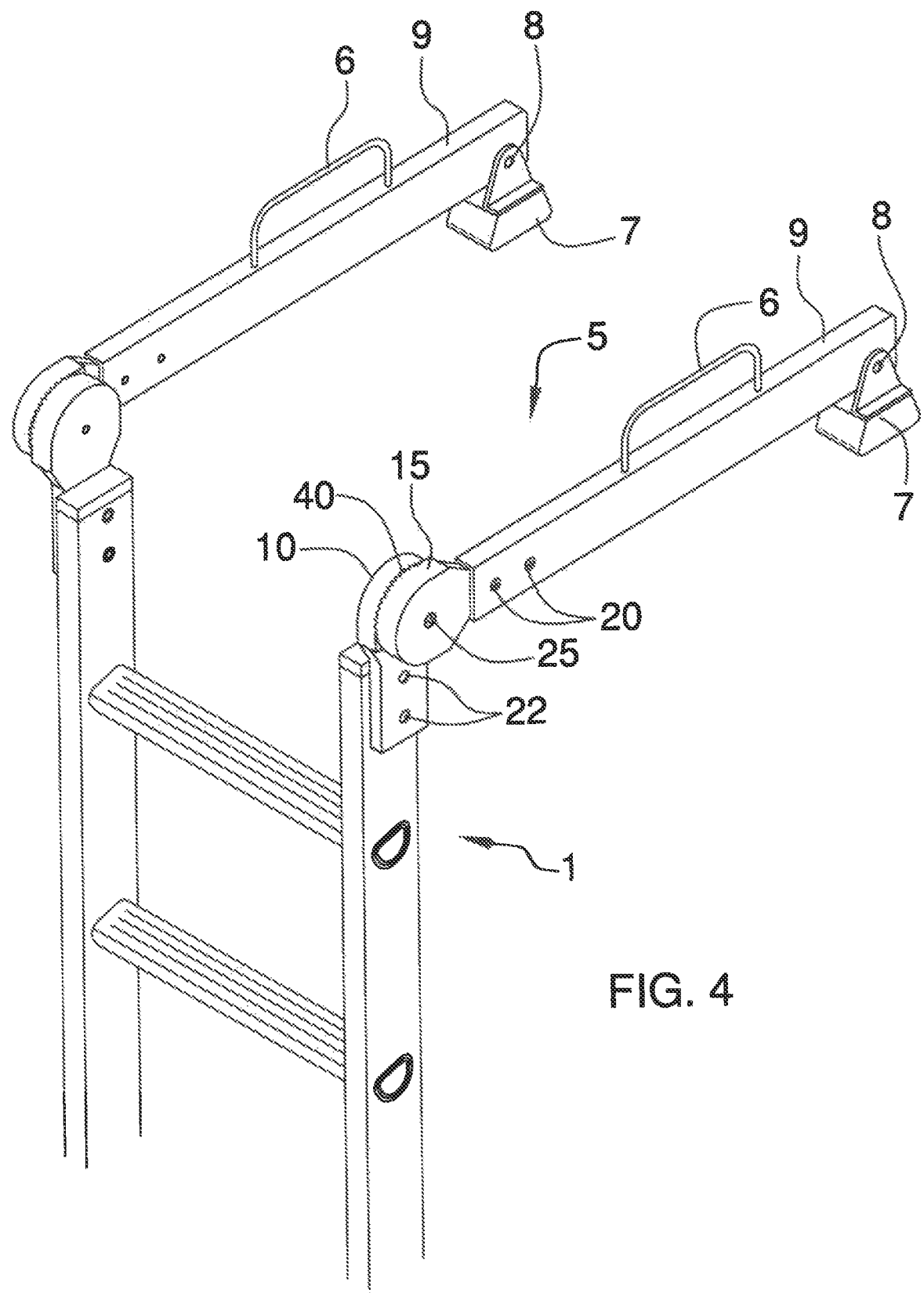
FIG. 4 is an isometric view of the device installed on an extension ladder.

A connection piece 9 will extend from and be attached to the laterally separating ratchet mechanism at one end to the footer 7 at the opposite end. The footer 7 will have a flat surface that will rest on the roof surface and will be a predetermined shape. An element 8 to secure the footer to the connection piece 9 is provided and that is likely to be a bolt or screw. Other elements to attach the footer 7 may also be contemplated. As the extension ladder is raised above the roof and the footer makes contact with the roof the ratchet will self-adjust the device so that the device is installed as depicted in FIG. 5. While the footer 7 in FIG. 4 has a certain predetermined shape, other shapes may be used depending on the roof type.

When the ladder is to be removed from the house/roof line, the user tilts the ladder away from the house, when that occurs, the connection piece 9 with the footer 7 will rotate clockwise towards the arms of the extension ladder. This is accomplished because the weight of the connection piece and the angular teeth 40 will permit the connection piece 9 to rotate downwards. Because of the angular teeth 40 and the bolt and spring the connection piece 9 cannot rotate in a counterclockwise direction.

While the embodiments of the invention have been disclosed, certain modifications may be made by those skilled in the art to modify the invention without departing from the spirit of the invention.

The inventor claims:

1. A safety device configured to removably attach to an upper-most end of a side rail of an extension ladder, the safety device comprising:
   a. a laterally separating ratchet comprising of:
   a first member having a first through-hole and a first plurality of angular teeth, wherein the first member has a first end and a second end, wherein the first end k configured to removably affix to the extension ladder;
   a second member having a second through-hole and a second plurality of angular teeth, the second member having a first end and a second end;
   a spring provided within the second through-hole and biasing the first plurality of teeth toward engagement with the second plurality of teeth;
   a bolt having a major longitudinal axis, and provided within the spring, the second through-hole and the first through-hole;
   wherein the first and second members are configured to move relative to each other along the major longitudinal axis between a first position and a second position;
   the first position defined when a biasing force of the spring still forces the first and second plurality of teeth into contact with each other so that the first member can rotate in a first direction relative to the second member about the major longitudinal axis, but the first member is prevented from rotating in an opposite second direction relative to the second member about the major longitudinal axis; and,
   the second position defined when the first and second members are separated along the major longitudinal axis by a force overcoming the biasing force of the spring so that the teeth are not in contact with each other which allows the first and second members to rotate relative to one another in both of the first and second directions;
   b. a connection piece having a first end and a second end along a major length, wherein the first end of the second member is removably affixed within the first end of the connection piece;
   c. a footer pivotably affixed to the second end of the connection piece, the footer configured to pivot to rest flat against a pitched roof to support the ladder against the pitched roof;
   wherein, when the first end of the first member is affixed to the extension ladder and the ratchet k in the first position, an angle between the connection piece and the extension ladder k configured to self-adjust to correspond with a pitch of the pitched roof.

2. The safety device as described in claim 1, wherein the footer is removable from the connection piece.

3. The safety device as described in claim 1, wherein the first end of the first member is attached to the extension ladder.

4. The safety device as described in claim 1 wherein a handle is affixed to the connection piece.

5. The safety device as described in claim 3 wherein the first end of the first member is integrated into the side rail of the extension ladder.

\* \* \* \* \*